United States Patent
Naito et al.

(10) Patent No.: US 9,299,487 B2
(45) Date of Patent: Mar. 29, 2016

(54) LAMINATED COIL COMPONENT AND METHOD FOR MANUFACTURING SAME

(71) Applicant: MURATA MANUFACTURING CO., LTD., Kyoto-fu (JP)

(72) Inventors: Osamu Naito, Nagaokakyo (JP); Hiroki Kowada, Nagaokakyo (JP); Atsushi Yamamoto, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 14/178,196

(22) Filed: Feb. 11, 2014

(65) Prior Publication Data

US 2014/0197917 A1    Jul. 17, 2014

Related U.S. Application Data

(63) Continuation of application No. PCT/JP2012/070460, filed on Aug. 10, 2012.

(30) Foreign Application Priority Data

Aug. 18, 2011   (JP) ................. 2011-179063

(51) Int. Cl.
  *H01F 5/00*     (2006.01)
  *H01F 27/24*    (2006.01)
  (Continued)

(52) U.S. Cl.
  CPC ............... *H01F 5/003* (2013.01); *B32B 18/00* (2013.01); *C04B 35/265* (2013.01); *H01F 1/344* (2013.01);
  (Continued)

(58) Field of Classification Search
  CPC ... H01F 5/003; H01F 17/0013; H01F 41/046; H01F 41/041; H01F 1/344; H01F 2017/0066; B32B 18/00; C04B 35/265; C04B 2235/3279; C04B 2235/3281; C04B 2235/3284; C04B 2235/3298; C04B 2235/6584; C04B 2235/75; C04B 2237/34; C04B 2237/62
  USPC .................. 336/200, 233, 234, 83; 428/692.1
  See application file for complete search history.

(56) References Cited

U.S. PATENT DOCUMENTS

2001/0024739 A1*   9/2001   Mizoguchi et al. ........... 428/692
2009/0021337 A1*   1/2009   Sato ............................ 336/234

FOREIGN PATENT DOCUMENTS

| JP | S63-102215 A | 5/1988 |
|----|--------------|--------|
| JP | 03-053606 A  | 3/1991 |

(Continued)

OTHER PUBLICATIONS

International Search Report; PCT/JP2012/070460; Nov. 6, 2012.
(Continued)

*Primary Examiner* — Mangtin Lian
(74) *Attorney, Agent, or Firm* — Studebaker & Brackett PC (57) ABSTRACT

A laminated coil component that has DC superimposition characteristics improved without causing an increase in direct-current resistance, and reduces stress which can be generated in a magnetic body. A laminated coil component includes a magnetic section of magnetic layers stacked and a conductor section which has a plurality of conductor pattern layers arranged between the magnetic layers, and interconnected in a coiled shape to pass through the magnetic layers, and which is buried in the magnetic section. The conductor section is composed of a conductor containing silver. The magnetic section is of a sintered ferrite material containing $Fe_2O_3$, NiO, ZnO, and CuO. The ratio of the Cu content (in terms of CuO) in a near-conductor section region of the magnetic section to the Cu content (in terms of CuO) in a central region of the magnetic section is 0.2 to 0.5.

3 Claims, 4 Drawing Sheets

(51) Int. Cl.
*H01F 17/00* (2006.01)
*H01F 1/34* (2006.01)
*B32B 18/00* (2006.01)
*C04B 35/26* (2006.01)
*H01F 41/04* (2006.01)

(52) U.S. Cl.
CPC .......... *H01F 17/0013* (2013.01); *H01F 41/041* (2013.01); *H01F 41/046* (2013.01); *C04B 2235/3279* (2013.01); *C04B 2235/3281* (2013.01); *C04B 2235/3284* (2013.01); *C04B 2235/3298* (2013.01); *C04B 2235/6584* (2013.01); *C04B 2235/75* (2013.01); *C04B 2237/34* (2013.01); *C04B 2237/62* (2013.01); *H01F 2017/0066* (2013.01)

(56) References Cited

FOREIGN PATENT DOCUMENTS

| | | |
|---|---|---|
| JP | 04-061203 A | 2/1992 |
| JP | H07-97525 B2 | 10/1995 |
| JP | 2001-244123 A | 9/2001 |
| JP | 2006-237438 A | 9/2006 |

OTHER PUBLICATIONS

An Office Action; "Notice of Reasons for Rejection," issued by the Japanese Patent Office on May 12, 2015, which corresponds to Japanese Patent Application No. 2013-529004 and is related to U.S. Appl. No. 14/178,196; with English language translation.

Written Opinion of the International Searching Authority; PCT/JP2012/070460; Nov. 6, 2012.

* cited by examiner

LAMINATED COIL COMPONENT AND METHOD FOR MANUFACTURING SAME

CROSS REFERENCE

This application claims benefit of priority to Japanese Patent Application No. 2011-179063 filed on Aug. 18, 2011, and to International Patent Application No. PCT/JP2012/070460 filed on Aug. 10, 2012, the entire content of each of which is incorporated herein by reference.

TECHNICAL FIELD

The present invention relates to a laminated coil component, and more particularly, to a laminated coil component including: a magnetic section of magnetic layers stacked; and a conductor section which has a plurality of conductor pattern layers arranged between the magnetic layers and interconnected in a coiled shape to pass through the magnetic layers, and which is buried in the magnetic section. Furthermore, the present invention also relates to a method for manufacturing the laminated coil component.

BACKGROUND

In general, laminated coil components are small in size and light in weight, but have the drawback of a small rated current as compared with wire-wound coil components, because magnetic saturation of the magnetic body decreases the inductance when a large direct-current is applied. Therefore, there is a need for the laminated coil components to be increased in saturated magnetic flux density, in other words, to be improved in DC superimposition characteristics (to achieve stable inductance over a larger direct-current range).

Conventionally, laminated coil components are manufactured in such a way that green sheets of a ferrite material and a conductor paste containing silver are subjected to co-firing in air to form sintered magnetic layers and conductor pattern layers. The laminated coil components obtained by such a manufacturing method also have the problem of having magnetic characteristics of the magnetic body degraded by residual stress generated in the magnetic body due to a difference in coefficient of thermal expansion between the ferrite material and silver.

Under the circumstances, Japanese Patent Application Laid-Open No. 2006-237438 proposes the use of, as a sintering modifier, a conductor paste mixed with $SiO_2$ for covering the silver powder. This sintering modifier is supposed to moderately diffuse into the magnetic body, and make sintering slower near the conductor pattern in the magnetic body than in the other section to make it possible to form a magnetically inactive layer in a gradient fashion, thereby probably making it possible to improve DC superimposition characteristics even over a larger current range. In addition, the sintering modifier is also supposed to be able to prevent the difference in coefficient of thermal expansion between the conductor pattern and the magnetic body from generating residual stress in the magnetic body to degrade magnetic properties.

SUMMARY

Problem to be Solved by the Invention

However, in the method described in Japanese Patent Application Laid-Open No. 2006-237438, the sintering modifier (specifically, $SiO_2$ for covering the silver powder) is mixed in the conductor paste, and another problem can be thus caused, which is that the resistance of a conductor section obtained from the sintered conductor paste is inevitably increased to increase the direct-current resistance (Rdc).

An object of the present invention is to provide a laminated coil component that has DC superimposition characteristics improved without causing an increase in direct-current resistance, and can reduce internal stress which can be generated in a magnetic body. Furthermore, a further object of the present invention is to provide a method for manufacturing the laminated coil component.

Means for Solving the Problem

According to an aspect of the present invention, a laminated coil component is provided which includes: a magnetic section of magnetic layers stacked; and a conductor section that has a plurality of conductor pattern layers arranged between the magnetic layers, and interconnected in a coiled shape to pass through the magnetic layers, and is buried in the magnetic section, where the conductor section includes a conductor containing silver, the magnetic section includes a sintered ferrite material containing Fe, Ni, Zn, and Cu, and the ratio of a Cu content (in terms of CuO) (weight %) in a near-conductor section region of the magnetic section to a Cu content (in terms of CuO) (weight %) in a central region of the magnetic section is 0.2 to 0.5.

In the above-described method for manufacturing a conventional laminated coil component, a Ni—Cu—Zn based ferrite material containing $Fe_2O_3$, NiO, ZnO, and CuO is typically used in which the CuO content is 8 mol % or more. The CuO has a lower melting point as compared with the other constituents of the Ni—Cu—Zn based ferrite material, and when the CuO content is reduced, the sinterability is decreased, there is thus a need to increase the firing temperature to a higher temperature than the melting point of silver in order to achieve sufficient sintering, thereby making it impossible to achieve co-firing of green sheets of the Ni—Cu—Zn based ferrite material and a conductor paste containing silver. Therefore, for the co-firing thereof in air, the CuO content is set at 8 mol % or more.

In contrast, as a result of earnest studies carried out by the inventors, a heat treatment condition has been found which can achieve co-firing of green sheets of a Ni—Cu—Zn based ferrite material and a conductor paste containing silver while the CuO content is reduced (as will be hereinafter described), and furthermore, it has been found that in a laminated coil component obtained under the heat treatment condition, the ratio y/x of the Cu content (in terms of CuO) in the near-conductor section region of the magnetic section (hereinafter, referred to as "y" (weight %) in this specification) to the Cu content (in terms of CuO) in the central region of the magnetic section (hereinafter, referred to as "x" (weight %) in this specification) is 0.5 or less. In the laminated coil component according to the present invention, this ratio y/x is 0.2 to 0.5, and thus, the sintered density and magnetic permeability of the near-conductor section region can be made lower than those of the central region while the Cu constituent derived from CuO is present in the near-conductor section region. The lower magnetic permeability of the near-conductor section region can improve the DC superimposition characteristics of the laminated coil component. Furthermore, the lower sintered density of the near-conductor section region can relax internal stress near the conductor section, and reduce the changes in magnetic properties (for example, inductance)

when the laminated coil component is subjected to a thermal shock test. In addition, in the laminated coil component according to the present invention, the conductor section is formed from the conductor containing silver, without using any sintering modifier such as $SiO_2$, and there is thus no possibility of causing an increase in direct-current resistance due to the sintering modifier.

Figure 4A:
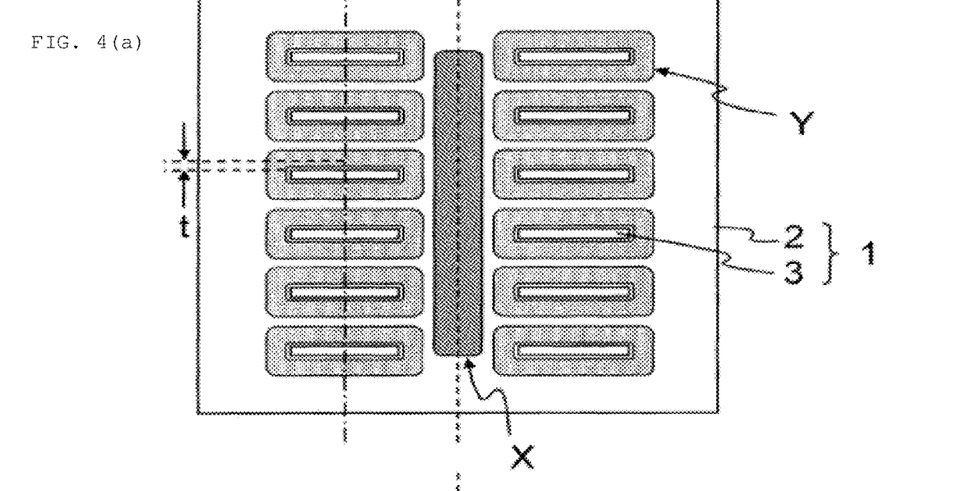

It is to be noted that "the central region of the magnetic section" in the present invention denotes a region located inside the coil formed by the conductor pattern layers and located on and near the central axis of the coil, and specifically, is typified by a region within 10 μm from the central axis of the coil (for example, the region X shown in FIG. 4(a)). "The near-conductor section region of the magnetic section" denotes a region of the magnetic section, which is adjacent to the interface between the magnetic section and the conductor section, and is typified by a region 1 μm or more away from the interface between the magnetic section and the conductor section into the magnetic section, but within 10 μm (for example, the region Y shown in FIG. 4(a)). The Cu content (in terms of CuO) (weight %) of the magnetic section is obtained, in such a way that the Cu content in a predetermined region of the magnetic section is measured with the use of wavelength-dispersive X-ray spectroscopy (WDX method), and the thus obtained Cu content is converted to CuO. The measurement area can differ depending on the analytical instrument used, and for example, the measurement beam diameter is, but not limited to, several tens nm to 1 μm. The measurement points can be appropriately set in a region to be measured, and the Cu content (in terms of CuO) (weight %) is figured out as an average value for the measurement values measured at some points in the region.

In the laminated coil component according to the present invention, the ratio y/x of the Cu content (in terms of CuO) y in the near-conductor section region of the magnetic section to the Cu content (in terms of CuO) x in the central region of the magnetic section is more preferably 0.2 to 0.3. According to the aspect, the changes in magnetic properties can be further reduced when the laminated coil component is subjected to a thermal shock test.

According to one aspect of the present invention, the Cu content (in terms of CuO) in the central region of the magnetic section is 0.2 to 3 weight %. The increased Cu content (in terms of CuO) in the central region of the magnetic section has a tendency to increase the ratio y/x mentioned above, while it is possible to make the ratio y/x of 0.5 or less when the Cu content (in terms of CuO) in the central region is 3 weight % or less. This low Cu content (in terms of CuO) in the central region of the magnetic section increases the saturated magnetic flux density (Bs) of the magnetic section to contribute to an improvement in DC superimposition characteristics. However, if the Cu content (in terms of CuO) in the central region of the magnetic section is less than 0.2 weight %, the difference will be decreased between the Cu content (in terms of CuO) in the central region of the magnetic section and the Cu (in terms of CuO) content in the near-conductor section region thereof to cause the ratio y/x to fall outside the appropriate range, and decrease the differences in magnetic permeability and crystal grain size between the central region and the near-conductor section region, and thus, the Cu content (in terms of CuO) in the central region is preferably 0.2 weight % or more.

According to another aspect of the present invention, provided is a method for manufacturing a laminated coil component including a magnetic section of magnetic layers stacked; and a conductor section that has a plurality of conductor pattern layers arranged between the magnetic layers, and interconnected in a coiled shape to pass through the magnetic layers, and is buried in the magnetic section, and the method includes:

stacking green sheets of a ferrite material containing $Fe_2O_3$, NiO, ZnO, and CuO and having a CuO content of 0.3 to 4 mol %, with silver-containing conductor paste layers interposed between the green sheets, to obtain a laminated body that has the conductor paste layers interconnected in a coiled shape to pass through the green sheets of the ferrite material; and applying a heat treatment in an atmosphere with an oxygen concentration of 0.1 vol % or less to the laminated body to provide fired green sheets of the ferrite material and fired silver-containing conductor paste layers respectively as magnetic layers and conductor pattern layers which respectively form the magnetic section and the conductor section.

As described above, the inventors have found the heat treatment condition which can achieve co-firing of the green sheets of the Ni—Cu—Zn based ferrite material and the conductor paste containing silver while the CuO content is reduced. Specifically, the inventors have come up with a finding that when the ferrite material containing $Fe_2O_3$, NiO, ZnO, and CuO and with the CuO content of 0.3 to 4 mol % is used for firing the ferrite material in an atmosphere with an oxygen concentration of 0.1 vol % or less, the ferrite material can be sintered at lower temperatures than in the case of firing the ferrite material in air (at lower temperatures than the melting point of silver) while ensuring a high resistivity (specifically, a resistivity of $10^6$ Ω·cm or more). The sintered ferrite material thus obtained is a soft magnetic material that has a high saturated magnetic flux density (Bs) because of the reduced Cu content (in terms of CuO). The manufacturing method according to the present invention applies the heat treatment in an atmosphere with an oxygen concentration of 0.1 vol % or less to the laminated body including: the green sheets of the ferrite material containing $Fe_2O_3$, NiO, ZnO, and CuO and with the CuO content of 0.3 to 4 mol %; and the conductor paste layers containing silver. Thus, the green sheets of the ferrite material and the conductor paste layers containing silver can be subjected to co-firing, and the thus obtained magnetic section has a high resistivity, and a high sintered density in a central region thereof. The implementation of the manufacturing method according to the present invention can adjust the Cu content (in terms of CuO) in the near-conductor region of the magnetic section to 0.2 to 0.5 with respect to the Cu content (in terms of CuO) in the central region thereof, and realize the above-described laminated coil component according to the present invention. Advantageous effect of the invention According to the present invention, the Cu content (in terms of CuO) in the near-conductor region of the magnetic section is 0.2 to 0.5 with respect to the Cu content (in terms of CuO) in the central region thereof, and a laminated coil component is thus provided which is improved in DC superimposition characteristics, and able to reduce internal stress which can be generated in the magnetic body. In the laminated coil component according to the present invention, no sintering modifier is used unlike in Japanese Patent Application Laid-Open No. 2006-237438, and there is thus no possibility of causing an increase in direct-current resistance due to the sintering modifier. Furthermore, according to the present invention, the method for manufacturing a laminated coil component is also provided.

BRIEF DESCRIPTION OF THE DRAWINGS

FIGS. 4(a) and 4(b) are diagrams corresponding to FIG. 3, where FIG. 4(a) is a diagram illustrating a central region and a near-conductor section region in a magnetic section, whereas

DETAILED DESCRIPTION

A laminated coil component and a manufacturing method therefor according to the present invention will be described below in detail with reference to the drawings.

Figure 1:
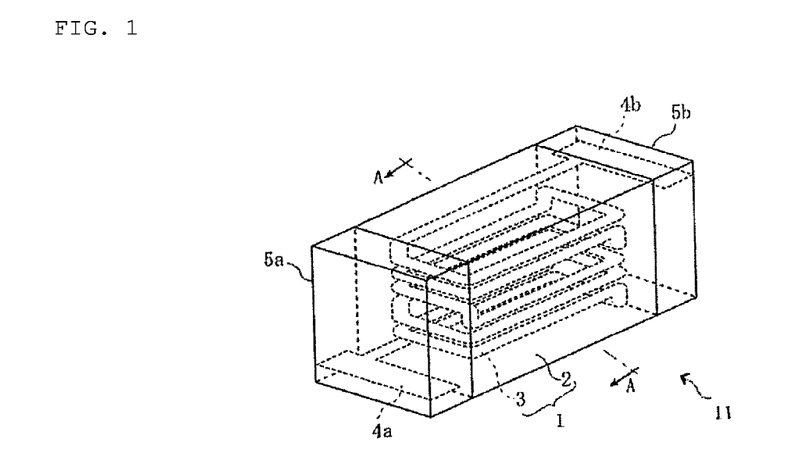
FIG. 1 is a schematic perspective view of a laminated coil component according to an embodiment of the present invention.
Figure 3:
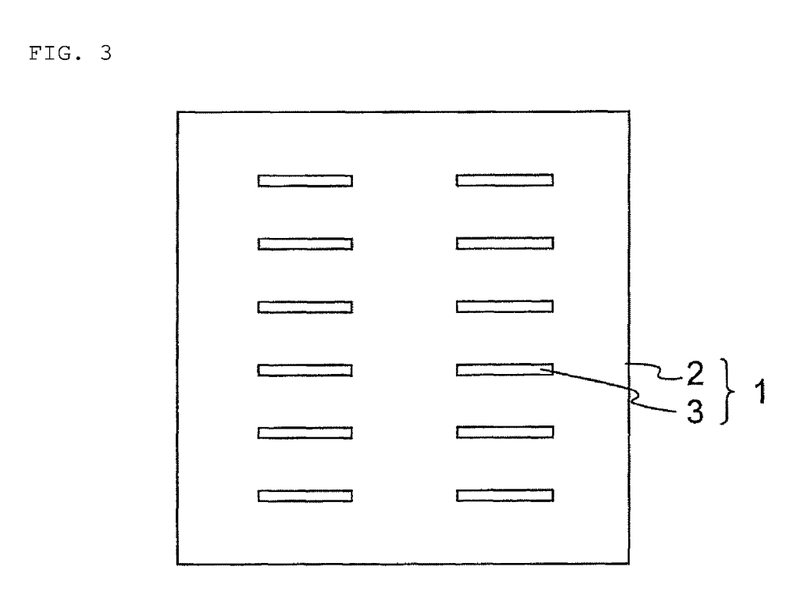
FIG. 3 is a schematic cross-sectional view illustrating a laminated coil component according to a modification example of the embodiment in FIG. 1, along the line A-A' of FIG. 1.

As shown in FIGS. 1 and 3, a laminated coil component 11 according to the present embodiment includes, schematically, a laminated body 1 that has: a magnetic section 2; and a coiled conductor section 3 buried in the magnetic section 2, external electrodes 5a and 5b can be provided so as to cover both outer end surfaces of the laminated body 1, and extraction sections 4a and 4b located at both ends of the conductor section 3 can be respectively connected to the external electrodes 5a and 5b.

Figure 2:
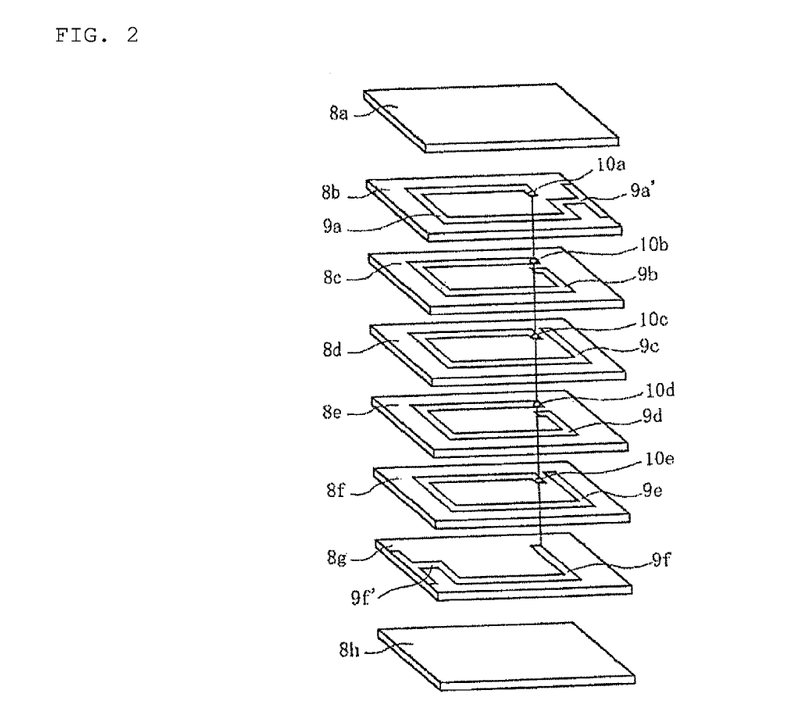
FIG. 2 is a schematic exploded perspective view of the laminated coil component according to the embodiment in FIG. 1, with external electrodes omitted.

More particularly, referring to FIG. 2, the magnetic section 2 is composed of magnetic layers 8a to 8h stacked. Furthermore, for the conductor section 3, multiple conductor pattern layers 9a to 9f respectively arranged between the magnetic layers 8a to 8h are interconnected in a coiled shape through via holes 10a to 10e provided to penetrate through the magnetic layers 8b to 8f. However, it is to be noted that the magnetic section 2 and conductor section 3 according to the present embodiment are not limited to the example shown, in terms of configuration, shape, number of turns, arrangement, etc.

The magnetic section 2 is composed of a sintered ferrite material containing $Fe_2O_3$, NiO, ZnO, and CuO. The Cu content (in terms of CuO) of the magnetic section 2 will be described later. The conductor section 3 may be composed of any conductor containing silver, but is preferably composed of a conductor containing silver as its main constituent. The external electrodes 5a, 5b are not particularly limited, but typically composed of a conductor containing silver as its main constituent, and if necessary, plated with nickel and/or tin.

The laminated coil component 11 according to the present embodiment is manufactured in the following way.

First, green sheets are prepared from a ferrite material that contains $Fe_2O_3$, NiO, ZnO, and CuO, and has a CuO content of 0.3 to 4 mol %.

The ferrite material contains, as its main constituents, $Fe_2O_3$, ZnO, NiO, and CuO, and may further contain additive constituents such as $Bi_2O_3$, if necessary. Typically, the ferrite material can be prepared, but not to be considered limited to, in such a way that powders of these constituents, as raw materials, are mixed in desired proportions, and subjected to calcination.

In the present embodiment, the CuO content in the ferrite material is 0.3 to 4 mol % (on the basis of the total of the main constituents). With the CuO content of 0.3 to 4 mol %, firing the laminated body by a heat treatment as described later can improve the DC superimposition characteristics, and reduce the changes in magnetic properties when the laminated body is subjected to a thermal shock test.

The $Fe_2O_3$ content in the ferrite material is preferably 44 to 49.8 mol % (on the basis of the total of the main constituents). The $Fe_2O_3$ content of 44 mol % or more can achieve a high magnetic permeability in a central region of the magnetic section, and thus acquire high inductance. In addition, the $Fe_2O_3$ content of 49.8 mol or less can achieve a highly sintered property.

The ZnO content in the ferrite material is preferably 6 to 33 mol % (on the basis of the total of the main constituents). The ZnO content of 6 mol % or more can achieve a high magnetic permeability, and thus acquire high inductance. In addition, the ZnO content of 33 mol % or less can avoid a decrease in Curie point, and thus avoid a decrease in the operating temperature of the laminated coil component.

The NiO content in the ferrite material is not particularly limited, but can be the rest excluding CuO, $Fe_2O_3$, and ZnO as the other main constituents.

In addition, the $Bi_2O_3$ content (additive amount) in the ferrite material is preferably 0.1 to 1 parts by weight with respect to 100 parts by weight of the main constituents ($Fe_2O_3$, ZnO, NiO, CuO) in total. The $Bi_2O_3$ content of 0.1 to 1 parts by weight further promotes low-temperature firing, and can avoid abnormal grain growth. The excessively high $Bi_2O_3$ content unfavorably makes abnormal grain growth likely to be caused, decreases the resistivity at the abnormal grain growth site, and causes the abnormal grain growth site to be plated in plate processing for the formation of external electrodes.

The ferrite material prepared in the way described above is used to prepare green sheets. For example, the green sheets may be obtained, but not to be considered limited to, in such a way that the ferrite material is mixed/kneaded with an organic vehicle containing a binder resin and an organic solvent, and formed into the shape of a sheet.

Separately, a conductor paste is prepared which contains silver. Commercially available common silver pastes can be used which contain silver in powder form, but the conductor paste is not limited thereto.

Then, the green sheets (corresponding to the magnetic layers 8a to 8h) of the ferrite material are stacked with the silver-containing conductor paste layers (corresponding to the conductor pattern layers 9a to 9f) interposed therebetween, to obtain a laminated body (which is an unfired laminated body corresponding to the laminated body 1) which has the conductor paste layers interconnected in a coiled shape through via holes (corresponding to the via holes 10a to 10e) provided to penetrate through the green sheets of the ferrite material.

The method for forming the laminated body is not particularly limited, and a sheet lamination method, a printing lamination, and the like may be used to form the laminated body. In the case of the sheet lamination method, a laminated body can be obtained by providing green sheets of the ferrite material appropriately with via holes, printing the conductor paste in a predetermined pattern (while filling the via holes with the conductor paste when the via holes are provided) to form conductor paste layers, staking and pressure-bonding the green sheets with the conductor paste layers formed appropriately, and cutting the pressure-bonded body into a predetermined size. In the case of the printing lamination method, a laminated body is prepared by repeating a step of printing a magnetic paste of the ferrite material to form a magnetic layer and a step of printing the conductor paste in a predetermined pattern to form a conductor paste layer.

In the step of forming the magnetic layer, a via hole is provided in a predetermined position so as to provide conduction between the upper and lower conductor paste layers, the magnetic paste is finally printed to form a magnetic layer (corresponding to the magnetic layer $8a$), and through cutting into a predetermined size, a laminated body can be obtained. This laminated body may be obtained in such a way that a plurality of pieces is prepared in a matrix at a time, and then cut into individual pieces (subjected to element separation) by dicing or the like for individualization, but may be individually prepared in advance.

Next, the laminated body obtained above is subjected to a heat treatment in an atmosphere with an oxygen concentration of 0.1 vol % or less to fire the green sheets of the ferrite material and the conductor paste layers containing silver, which are respectively regarded as the magnetic layers $8a$ to $8h$ and the conductor pattern layers $9a$ to $9f$. In the laminated body 1 thus obtained, the magnetic layers $8a$ to $8h$ form the magnetic section 2, whereas the conductor pattern layers $9a$ to $9f$ form the conductor section 3.

The heat treatment in the atmosphere with an oxygen concentration of 0.1 vol % or less can achieve sintering at lower temperatures than in the case of a heat treatment for the ferrite material in air, and for example, the firing temperature can be 850 to 930° C. While the present invention is not bound by any theory, in the case of firing in an atmosphere with a low oxygen concentration, oxygen defects are considered to be formed in the crystal structure and thereby to promote inter-diffusion of Fe, Ni, Cu, and Zn present in the crystal, and make it possible to enhance low-temperature sinterability.

In addition, the use of the Ni—Zn—Cu based ferrite material with the CuO content of 4 mol % or less can ensure a high resistivity in the magnetic section 2, even in the case of firing in an atmosphere with an oxygen concentration of 0.1 vol % or less. While the present invention is not bound by any theory, in the case of firing in an atmosphere with a low oxygen concentration, the reduction action of the atmosphere for the heat treatment is considered to reduce the CuO to $Cu_2O$, thereby decreasing the resistivity (decrease the impedance) of the magnetic section 2, and the reduced CuO content is considered to be able to suppress the generation of $Cu_2O$ through the reduction of CuO, thereby suppressing the decrease in resistivity. However, the oxygen concentration in the firing atmosphere may be 0.1 vol % or less, but is preferably 0.001 vol % or more in order to ensure the resistivity of the magnetic section 2. While the present invention is not bound by any theory, there was a thought that the excessively low oxygen concentration will produce more oxygen defects than necessary to decrease the resistivity of the magnetic section 2, and the presence of oxygen to some extent is considered to be able to avoid the excess generation of oxygen defects, thereby making it possible to ensure a high resistivity.

Next, the external electrodes $5a$ and $5b$ are formed so as to cover both end surfaces of the laminated body 1 obtained above. The external electrodes $5a$, $5b$ can be formed, for example, in such a way that a silver powder in the form of a paste with glass, etc., is applied to predetermined regions, and the obtained structure is subjected to a heat treatment at, for example, 800 to 850° C. to bake the silver.

In the way described above, the laminated coil component 11 according to the present embodiment is manufactured. In the laminated coil component 11, as shown in FIG. 4($a$), a central region X of the magnetic section 2 is defined as a region within 10 µm from the central axis (indicated by a dotted line) of the coil formed by the conductor section 3, whereas a near-conductor section region Y of the magnetic section 2 is defined as a region within 1 to 10 µm from the interface between the magnetic section 2 and the conductor section 3 in a direction toward the magnetic section 2. It is to be noted that while an example of the near-conductor section region Y separated between the conductor pattern layers is shown in FIG. 4($a$), the present embodiment is not limited to this example, and the near-conductor section region Y may have an overlap between the conductor pattern layers.

Figure 4B:
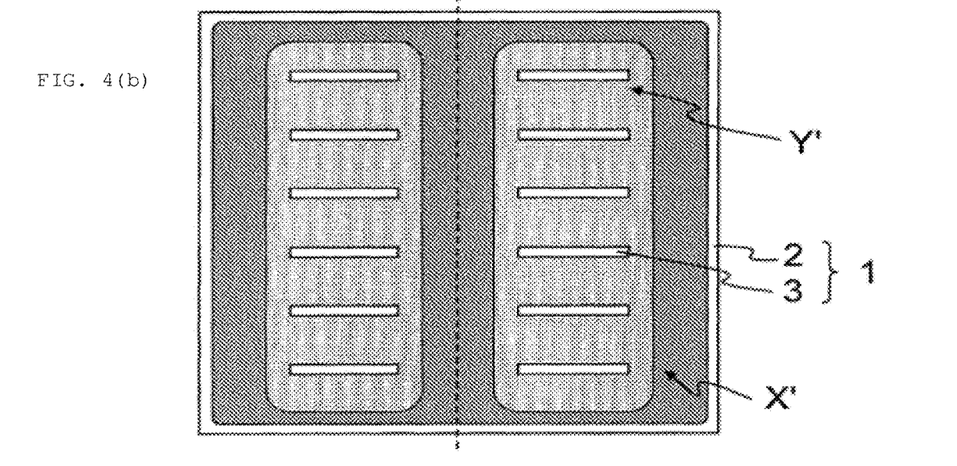
FIG. 4(b) is a diagram illustrating a high Cu content (in terms of CuO) region and a low Cu content (in terms of CuO) region by way of example.

The Cu content (in terms of CuO) y in the near-conductor section region Y of the magnetic section 2 is lower than the Cu content (in terms of CuO) x in the central region X of the magnetic section 2. While the present invention is not bound by any theory, when the ferrite material with the CuO content of 0.3 to 4 mol % and the conductor paste containing silver are subjected to co-firing in an atmosphere with an oxygen concentration of 0.1 vol % or less, the conductor section derived from the conductor paste is considered to absorb CuO from the ferrite material in the firing process, thereby decreasing the Cu content (in terms of CuO) in the near-conductor section region Y. More specifically, as shown in FIG. 4($b$) by way of example, a low Cu content (in terms of CuO) region Y' (including the near-conductor section region Y) is formed around the conductor section 3 in the magnetic section 2, and thus, the other bulk region (excluding a region adjacent to the outer surface of the laminated body 1) serves as a high Cu content (in terms of CuO) region X', with the Cu content (in terms of CuO) relatively increased. The Cu content (in terms of CuO) in the central region X of the magnetic section 2 can be understood as a representative of the Cu content (in terms of CuO) in the high Cu content (in terms of CuO) region X', whereas the Cu content (in terms of CuO) in the near-conductor section region Y of the magnetic section 2 can be understood as a representative of the Cu content (in terms of CuO) in the low Cu content (in terms of CuO) region Y'. It is to be noted that while the low Cu content (in terms of CuO) region Y' is preferably formed without any space between the conductor pattern layers as shown in FIG. 4($b$), the present invention is not limited to this low Cu content (in terms of CuO) region Y'.

In the laminated coil component 11, the Cu content (in terms of CuO) ratio y/x is 0.2 to 0.5, and preferably 0.2 to 0.3. The criterial Cu content (in terms of CuO) x, which depends on the CuO content of the ferrite material used, is 0.2 to 3 weight %, for example. As just described, the reduced Cu content (in terms of CuO) in the near-conductor section region Y of the magnetic section 2 decreases the sinterability of the near-conductor section region Y to suppress grain growth and thereby decrease the sintered density, and as a result, the magnetic permeability is also decreased. In contrast, because the Cu content (in terms of CuO) is relatively high in the central region X of the magnetic section 2, the high sinterability adequately promotes grain growth to increase the sintered density, and as a result, the magnetic permeability is also increased. In other words, the reduced magnetic permeability and lower sintered density can be simultaneously achieved in the near-conductor section region Y of the magnetic section 2 in the laminated coil component 11 according to the present embodiment.

When the laminated coil component 11 is used to apply an electric current to the conductor section 3, the magnetic flux formed around the conductor section 3 is likely to pass through a higher magnetic permeability region, and thus likely to pass through the high Cu content (in terms of CuO) region X' (which is a high magnetic permeability region, including the central region X) located outside the low Cu content (in terms of CuO) region Y' (which is a low magnetic permeability region, including the near-conductor section region Y), rather than the low Cu content (in terms of CuO) region Y', and the magnetic path is longer as compared with a case of the magnetic section 2 which is entirely high in magnetic permeability. As the magnetic path is longer, it becomes possible to achieve stable inductance over a larger direct-current range. Therefore, the laminated coil component 11 according to the present embodiment has improved DC superimposition characteristics.

In addition, while the laminated coil component 11 differs in coefficient of thermal expansion (in particular, linear expansion coefficient) between the magnetic section 2 composed of the sintered ferrite material and the conductor section 3 composed of the conductor containing silver, internal stress (or stress strain) can be relaxed or reduced which can be generated in the magnetic section 2 by a cooling process or the like after the heat treatment (firing), because the sintered density is low in the near-conductor section region Y of the magnetic section 2. Therefore, when the laminated coil component 11 is subjected to a thermal shock test, or exposed to a rapid change in temperature or subjected to external stress loading in use application (a reflow process in mounting onto a substrate or a practical use by a user) of the laminated coil component 11, the variation in internal stress can be reduced in the near-conductor section region Y (low sintered density region), and thus, the changes in magnetic properties such as inductance and impedance can be reduced.

Figure 5:
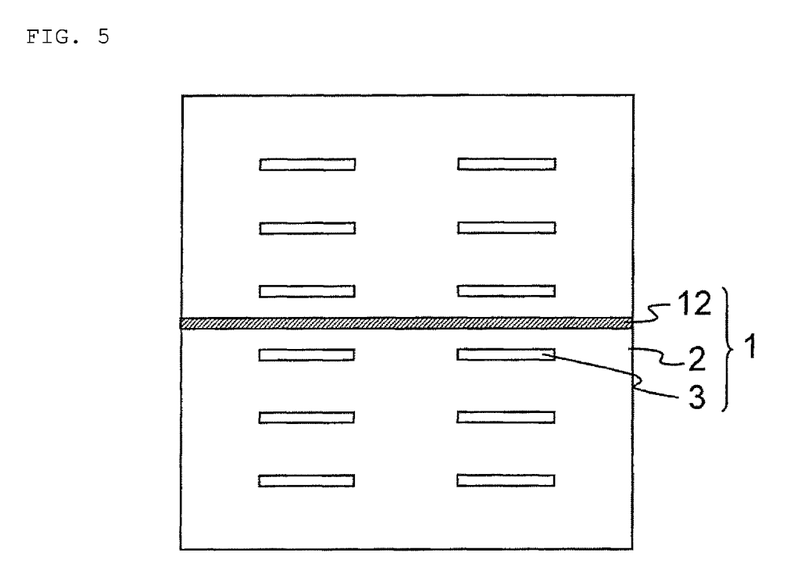
FIG. 5 is a diagram illustrating a laminated coil component according to a modification example of the embodiment in FIG. 1, which corresponds to FIG. 3.

While an embodiment of the present invention has been described above, various modifications can be made to this embodiment. For example, as shown in FIG. 5, a non-magnetic layer 12 may be provided so as to cross the magnetic path, and be used as an open magnetic circuit. As the non-magnetic layer 12, materials similar in coefficient of thermal expansion to the magnetic section 2 (magnetic layers 8a to 8h), for example, a Zn—Cu based ferrite material can be used which is obtained by substituting, with Zn, the total amount of Ni in the Ni—Cu—Zn based ferrite material of the magnetic section 2. This laminated coil component as an open magnetic circuit can make a further improvement in DC superimposition characteristics. Example Respective powders of $Fe_2O_3$, ZnO, NiO, CuO, and $Bi_2O_3$ were prepared as raw materials for the ferrite material. These powders were weighed so that the composition of $Fe_2O_3$, ZnO, NiO, and CuO as main constituents followed the proportions shown as Nos. 1 to 14 in Table 1, and 0.25 parts by weight of $Bi_2O_3$ was weighed and added with respect to 100 parts by weight of these main constituents in total. It is to be noted that sample Nos. 4 to 10 are examples of the present invention, whereas sample Nos. 1 to 3 and 11 to 14 (shown with the symbol "*" in the table) are comparative examples.

TABLE 1

| Sample No. | Main Constituent (mol %) | | | | Near-Conductor Section Region Y | | Central Region X | | Cu Content Ratio between Regions Y/X (in terms of CuO) (—) | Average Crystal Grain Size Ratio between Regions Y/X (—) |
|---|---|---|---|---|---|---|---|---|---|---|
| | $Fe_2O_3$ | ZnO | NiO | CuO | Cu Content (in terms of CuO) (weight %) | Average Crystal Grain Size (μm) | Cu Content (in terms of CuO) (weight %) | Average Crystal Grain Size (μm) | | |
| 1* | 49.0 | 20.0 | 31.0 | 0.0 | 0.00 | 0.52 | 0.00 | 0.52 | — | 1.00 |
| 2* | 49.0 | 20.0 | 30.9 | 0.1 | 0.00 | 0.52 | 0.05 | 0.53 | 0.00 | 0.98 |
| 3* | 49.0 | 20.0 | 30.8 | 0.2 | 0.00 | 0.52 | 0.15 | 0.62 | 0.00 | 0.84 |
| 4 | 49.0 | 20.0 | 30.7 | 0.3 | 0.10 | 0.53 | 0.20 | 0.90 | 0.50 | 0.59 |
| 5 | 49.0 | 20.0 | 30.5 | 0.5 | 0.10 | 0.53 | 0.35 | 1.20 | 0.29 | 0.44 |
| 6 | 49.0 | 20.0 | 30.3 | 0.7 | 0.15 | 0.72 | 0.50 | 1.60 | 0.30 | 0.45 |
| 7 | 49.0 | 20.0 | 30.0 | 1.0 | 0.15 | 0.85 | 0.70 | 2.00 | 0.21 | 0.43 |
| 8 | 49.0 | 20.0 | 29.0 | 2.0 | 0.40 | 1.10 | 1.35 | 2.30 | 0.30 | 0.48 |
| 9 | 49.0 | 20.0 | 28.0 | 3.0 | 0.70 | 1.50 | 2.00 | 2.40 | 0.35 | 0.63 |
| 10 | 49.0 | 20.0 | 27.0 | 4.0 | 1.00 | 1.90 | 2.70 | 2.40 | 0.37 | 0.79 |
| 11* | 49.0 | 20.0 | 26.0 | 5.0 | 1.85 | 2.15 | 3.40 | 2.30 | 0.54 | 0.93 |
| 12* | 49.0 | 20.0 | 25.0 | 6.0 | 2.30 | 2.20 | 4.05 | 1.80 | 0.57 | 1.22 |
| 13* | 49.0 | 20.0 | 24.0 | 7.0 | 2.75 | 2.20 | 4.75 | 1.50 | 0.58 | 1.47 |
| 14* | 49.0 | 20.0 | 23.0 | 8.0 | 3.30 | 2.00 | 5.40 | 1.30 | 0.61 | 1.54 |

Then, the weighed materials for each of sample Nos. 1 to 14 were put in a pot mill made of vinyl chloride, along with pure water and PSZ (Partial Stabilized Zirconia) balls, and subjected to adequate mixing and grinding in a wet way. The ground product was subjected to evaporative drying, and then to calcination for 2 hours at a temperature of 750° C. The calcined product thus obtained was again put in a pot mill made of vinyl chloride, along with ethanol and PSZ balls, subjected to adequate mixing and grinding, and further mixed with the addition of a polyvinyl butyral based binder (organic binder) to obtain a slurry (ceramic slurry) containing a ferrite material.

Next, a doctor blade method was used to form the ferrite material slurry obtained above into a sheet of 25 μm in thickness. The obtained compact was subjected to punching into a size of 50 mm×50 mm to prepare green sheets of the ferrite material.

Separately, a conductor paste containing a silver powder, varnish, and an organic solvent was prepared. After a laser processing machine was used to form via holes in predetermined positions of the green sheets prepared above, conductor paste layers were formed in such a way that the conductor paste was applied by screen printing onto surfaces of the green sheets while the via holes formed in the green sheets were filled with the conductor paste.

Then, the green sheets of the ferrite material with the conductor paste layers formed in a predetermined pattern were appropriately stacked, then sandwiched by green sheets of the ferrite material with no conductor paste layers formed, and subjected to pressure bonding at a temperature of 60° C. and a pressure of 100 MPa to prepare a pressure-bonded block. Then, this pressure-bonded block was cut into a predetermined size to prepare a laminated body.

The laminated body obtained above was heated to 400° C. in the atmosphere for sufficient degreasing. Then, the laminated body was put into a firing furnace controlled with a mixed gas of $N_2$—$O_2$ to have an oxygen partial pressure of 0.1 vol %, and subjected to a heat treatment (firing) by rising the temperature to 900° C. and keeping the temperature for 2 hours.

Thereafter, a conductive paste for external electrodes, containing a silver powder, glass frit, varnish, and an organic solvent, was prepared, applied onto both ends of the laminated body subjected to the heat treatment as described above, dried, then baked at 750° C., and furthermore, subjected to Ni and Sn plating sequentially by electrolytic plating to form external electrodes.

As described above, laminated coil components were prepared for sample Nos. 1 to 14. It is to be noted that the external dimensions of the laminated coil components were 2.0 mm in length, 1.2 mm in width, and 1.0 mm in thickness, and the number of turns in the conductor section (coil) was adjusted to be able to acquire a predetermined inductance value (approximately 1 μH at 1 MHz).

(Evaluation)

The laminated coil components obtained for sample Nos. 1 to 14 were evaluated for Cu content (in terms of CuO), average crystal grain size, and DC superimposition characteristics, and in a thermal shock test.

Cu Content (In Terms of CuO)

Ten laminated coil components for each of sample Nos. 1 to 14 were used for encasement in resin, polished to a position of about ½ in the thickness direction (the position of the line A-A in FIG. 1), and cleaned. Then, at the exposed surface of the laminated body 1 as shown in FIG. 4(a), the central region X and near-conductor section region Y of the magnetic section 2 were subjected to quantitative analysis of compositions (with the measurement beam diameter of 1 μam, the measurement in the central region X was made roughly in the center inside the coil, whereas the measurement in the near-conductor section region Y was made with the measurement beam center placed in a position of t=approximately 5 μm from the interface between the magnetic section 2 and the conductor section 3 into the magnetic section 2) with the use of wavelength-dispersive X-ray spectroscopy (WDX method) to figure out the Cu content (in terms of CuO) of the magnetic section 2 in the regions X and Y, and calculate the average values for the ten laminated coil components. The results are shown together in Table 1.

Average Crystal Grain Size

Ten laminated coil components for each of sample Nos. 1 to 14 were used for encasement in resin, polished to a position of about ½ in the thickness direction (the position of the line A-A in FIG. 1), and further subjected to chemical etching. With the use of a scanning electron microscope (SEM), SEM images were taken in the central region X and the near-conductor section region Y (the same regions X and Y as mentioned above) of the magnetic section 2, and from the SEM images, the average crystal grain sizes were determined in terms of equivalent circle diameter with the use of image analysis software "A-zo kun" (registered trademark) from Asahi Kasei Engineering Corporation in conformity with the JIS (R1670) to calculate the average values for the ten laminated coil components as the average crystal grain sizes. The results are shown together in Table 1.

—DC Superimposition Characteristics

With the use of fifty laminated coil components used for each of sample Nos. 1 to 14, a direct-current of 1 A was superimposed on the laminated coil components in conformity with the JIS (C2560-2). Before and after the DC superimposition, the inductance L for the laminated coil components was measured at a frequency of 1 MHz to figure out the rate of inductance change between before and after the DC superimposition test, and calculate the average value for the fifty laminated coil components. The results are shown in Table 2.

Heat Cycle Test (Thermal Shock Test)

With the use of fifty laminated coil components used for each of sample Nos. 1 to 14, 2000 cycles were repeated in accordance with a predetermined temperature profile in the range of −55° C. to +125° C. Before and after the heat cycle test, the inductance L for the laminated coil components was measured at a frequency of 1 MHz to figure out the rate of inductance change between before and after the heat cycle test, and calculate the average value for the fifty laminated coil components. The results are shown in Table 2.

TABLE 2

| Sample No. | Rate of Inductance Change in DC Superimposition Characteristics (%) | Rate of Inductance Change in Heat Cycle Test (%) |
|---|---|---|
| 1* | −54 | 32 |
| 2* | −51 | 26 |
| 3* | −46 | 25 |
| 4 | −39 | 15 |
| 5 | −36 | 5 |
| 6 | −34 | 4 |
| 7 | −35 | 6 |
| 8 | −35 | 8 |
| 9 | −36 | 11 |
| 10 | −36 | 13 |
| 11* | −41 | 22 |
| 12* | −43 | 23 |
| 13* | −43 | 23 |
| 14* | −47 | 24 |

As understood from Table 1, in the case of the laminated coil components of sample Nos. 4 to 10 obtained with the use of the Ni—Cu—Zn based ferrite material with the CuO content of 0.3 to 4.0 mol %, the Cu content (in terms of CuO) in the central region X of the magnetic section falls within the range of 0.2 to 3 weight %, and the Cu content (in terms of CuO) ratio of the near-conductor section region Y to the central region X falls within the range of 0.2 to 0.5. In addition, in the case of the laminated coil components of sample Nos. 4 to 10, the crystal grain size ratio of the near-conductor section region Y in the magnetic section to the central region X of the magnetic section is 0.80 or less. This indicates that CuO is absorbed in the near-conductor section region of the magnetic section to decrease the sinterability, thereby suppressing grain growth.

In contrast, in the case of the laminated coil components of sample Nos. 1 to 3 and 11 to 14 obtained with the use of the Ni—Cu—Zn based ferrite material with the CuO content of 0.2 mol % or less or 5.0 mol % or more, the Cu content (in terms of CuO) in the near-conductor section region Y of the magnetic section is zero weight % (less than the measurement lower limit), and the Cu content (in terms of CuO) ratio of the near-conductor section region Y to the central region X is zero or not calculable, or greater than 0.5. In addition, in the case of the laminated coil components of sample Nos. 1 to 3 and 11 to 14, the crystal grain size ratio of the near-conductor section region Y to the central region X is greater than 0.80.

Furthermore, as understood from Table 2, in the case of the laminated coil components of sample Nos. 4 to 10, the change in inductance in the DC superimposition characteristics is reduced as compared with the laminated coil components of sample Nos. 1 to 3 and 11 to 14, and improved DC superimposition characteristics have been thus confirmed. In addition, it has been confirmed that the change in inductance in the heat cycle test is reduced in the case of the laminated coil components of sample Nos. 4 to 10, as compared with the laminated coil components of sample Nos. 1 to 3 and 11 to 14. In particular, it has been confirmed that beneficial effects are achieved in the case of the laminated coil components of sample Nos. 4 to 10 (the Cu content (in terms of CuO) ratio of the near-conductor section region Y to the central region X falls within the range of 0.2 to 0.3.

INDUSTRIAL APPLICABILITY

The laminated coil component obtained according to the present invention can be widely used for various applications, for example, as inductors and transformers in high-frequency circuits and power circuits.

The invention claimed is:
1. A laminated coil component comprising:
a magnetic section including stacked magnetic layers; and
a conductor section having a plurality of conductor pattern layers arranged between the magnetic layers, and the conductor pattern layers being interconnected in a coiled shape to pass through the magnetic layers, the conductor section being buried in the magnetic section,
the conductor section including a conductor containing silver,
the magnetic section including a sintered ferrite material containing Fe, Ni, Zn, and Cu, and
a ratio of Cu content in CuO in a near-conductor section region of the magnetic section to Cu content in CuO in a central region of the magnetic section is 0.2 to 0.5.
2. The laminated coil component according to claim 1, wherein the ratio of Cu content in CuO in the near-conductor section region of the magnetic section to Cu content in CuO in the central region of the magnetic section is 0.2 to 0.3.
3. The laminated coil component according to claim 1, wherein the Cu content in CuO in the central region of the magnetic section is 0.2 to 3 weight %.

\* \* \* \* \*